(12) United States Patent
Liu et al.

(10) Patent No.: US 10,261,966 B2
(45) Date of Patent: Apr. 16, 2019

(54) VIDEO SEARCHING METHOD AND VIDEO SEARCHING SYSTEM

(71) Applicant: QNAP Systems, Inc., New Taipei (TW)

(72) Inventors: Chan-Cheng Liu, New Taipei (TW); TienLung Chang, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 699 days.

(21) Appl. No.: 14/815,585

(22) Filed: Jul. 31, 2015

(65) Prior Publication Data

US 2016/0259854 A1 Sep. 8, 2016

(30) Foreign Application Priority Data

Mar. 6, 2015 (TW) .............................. 104107297 A

(51) Int. Cl.
| | |
|---|---|
| G06F 16/00 | (2019.01) |
| G06F 16/738 | (2019.01) |
| G06F 16/78 | (2019.01) |
| G06K 9/00 | (2006.01) |

(52) U.S. Cl.
CPC .......... G06F 16/739 (2019.01); G06F 16/78 (2019.01); G06K 9/00771 (2013.01)

(58) Field of Classification Search
CPC ......... G06F 17/30843; G06F 17/30817; G06F 16/7335; G06F 16/7328; G06F 16/738; G06F 16/739; G06F 16/78; G06K 9/00771; Y10S 707/913; Y10S 707/914; Y10S 707/99943; Y10S 707/99933
See application file for complete search history.

(56) References Cited

U.S. PATENT DOCUMENTS

| | | | | |
|---|---|---|---|---|
| 8,745,499 B2* | 6/2014 | Pendergast | ............ | G06F 3/0482 715/713 |
| 8,769,421 B2* | 7/2014 | Meaney | ................ | G11B 27/031 715/723 |
| 2014/0105565 A1* | 4/2014 | Hwang | ................ | G11B 27/105 386/230 |
| 2014/0355823 A1* | 12/2014 | Kwon | ................ | G06K 9/00711 382/103 |

* cited by examiner

*Primary Examiner* — Cheryl Lewis
(74) *Attorney, Agent, or Firm* — Muncy, Geissler, Olds & Lowe, P.C.

(57) ABSTRACT

A video searching method and a video searching system are applied to an auxiliary searching of an original video. The video searching method includes setting a region-of-interest in a screen of the original video, setting a capturing condition that includes an interactive relation between the region-of-interest and a moving object of the original video, capturing a background screen of the original video and object snapshots of the moving object that comply with the capturing condition, selecting at least one of the object snapshots captured from the same moving object as a representative object snapshot, or integrating some of the object snapshots as a single representative object snapshot; and pasting the representative object snapshot at a coordinate corresponding to the background screen according to a corresponding timestamp, to generate a graphical event timeline that displays all the object snapshots.

10 Claims, 8 Drawing Sheets

VIDEO SEARCHING METHOD AND VIDEO SEARCHING SYSTEM

BACKGROUND OF THE INVENTION

1. Field of the Invention

The present invention relates to video searching methods and video searching systems, and, more particularly, to a video searching method and a video searching system that are applied to an auxiliary searching of an original video.

2. Description of Related Art

In modern life, a video surveillance system having a camera module is widely installed in a public region, such as stations, shops and roads, to provide security and prevent crime commitment. The video surveillance system can also help searching men or lost objects. No matter what the use is, analyzing and searching the original video recorded is a key step.

However, since the original video records events lasting for as long as hours or a few days, it takes time and money to analyze and search the original video. A conventional video displaying system can only display video is a quick mode and jump to display videos at a time axis. Therefore, a user can only watch a video screen of a specific time point every moment, and cannot watch all of the objects-of-interest at different time. The conventional video displaying system also cannot provide any corresponding information of contrast and time among objects. Another type of video displaying system that is used to compile films can display complete video screens according to a time sequence. However, since the time segment during which the screen can be displayed in one time is very short, and the non-key portion of the original video cannot be excluded, the video displaying system has a limited effect of searching video objects.

Therefore, how to provide a novel method to understand and search video contents, break through the limits of the conventional method in the time dimension, and display the key contents of the video completely is becoming an urgent issue in the art.

SUMMARY OF THE INVENTION

In view of the above-mentioned problems of the prior art, the present invention provides a video searching method applied to an auxiliary searching of an original video, comprising: setting a region-of-interest in a screen of the original video; setting a capturing condition that includes an interactive relation between the region-of-interest and a moving object of the original video; capturing a background screen of the original video and object snapshots of the moving object that comply with the capturing condition; and pasting the object snapshots at a coordinate corresponding to the background screen according to a corresponding timestamp, to generate a graphical event timeline.

A video searching method applied to an auxiliary searching of an original video comprises: setting a region-of-interest in a screen of the original video; setting a capturing condition that includes an interactive relation between the region-of-interest and a moving object of the original video; capturing a background screen of the original video and object snapshots of the moving object that comply with the capturing condition; selecting at least one of the object snapshots captured from the same moving object as a representative object snapshot, or integrating some of the object snapshots as a single representative object snapshot; and pasting the representative object snapshot at a coordinate corresponding to the background screen according to a corresponding timestamp, to generate a graphical event timeline.

A video searching system applied to an auxiliary searching of an original video comprises: a setting module that sets a region-of-interest in the original video, and sets a capturing condition that includes an interactive relation between the region-of-interest and a moving object of the original video; a capturing module that captures a background screen of the original video and object snapshots of the moving object that comply with the capturing condition; and a graphical data generating module that selects at least one of the object snapshots captured from the same moving object as a representative object snapshot, or integrating some of the object snapshots as a single representative object snapshot, and pastes the representative object snapshot at a coordinate corresponding to the background screen according to a corresponding timestamp, to generate a graphical event timeline.

Compared with the prior art, a video searching method and a video searching system according to the present invention set searching key points including a region-of-interest and a capturing condition, filters out a moving object that a user is interested in, captures object snapshots of the moving object, and pastes the object snapshots at a coordinate corresponding to the background screen based on their timestamps, to generate and display all of the object snapshots. Therefore, mapping relations of a specific object at a plurality of time points and a time relation among a plurality of object-of-interests are provided, a user can thus understand the moving behaviors of the object in the vide, the efficiency of searching an video for objects is greatly increased, and the key contents of the video can be displayed completely. Additionally, a video displaying module, a searching module and related displaying and filtering functions can be added to the video searching system, to further increase the efficiency of searching the video for objects.

BRIEF DESCRIPTION OF DRAWINGS

The invention can be more fully understood by reading the following detailed description of the preferred embodiments, with reference made to the accompanying drawings, wherein.

DETAILED DESCRIPTION OF THE INVENTION

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

A video searching method and a video searching system are applied to an auxiliary searching of an original video, such as an original video recorded by a camera or a monitor of a video surveillance system. In an embodiment, a background screen of the original video is defined as a static scene in a frame of a video stream, and does not change or changes slightly and slowly, such as lighting variation during a day, in time sequence frames of a video.

Figure 1:
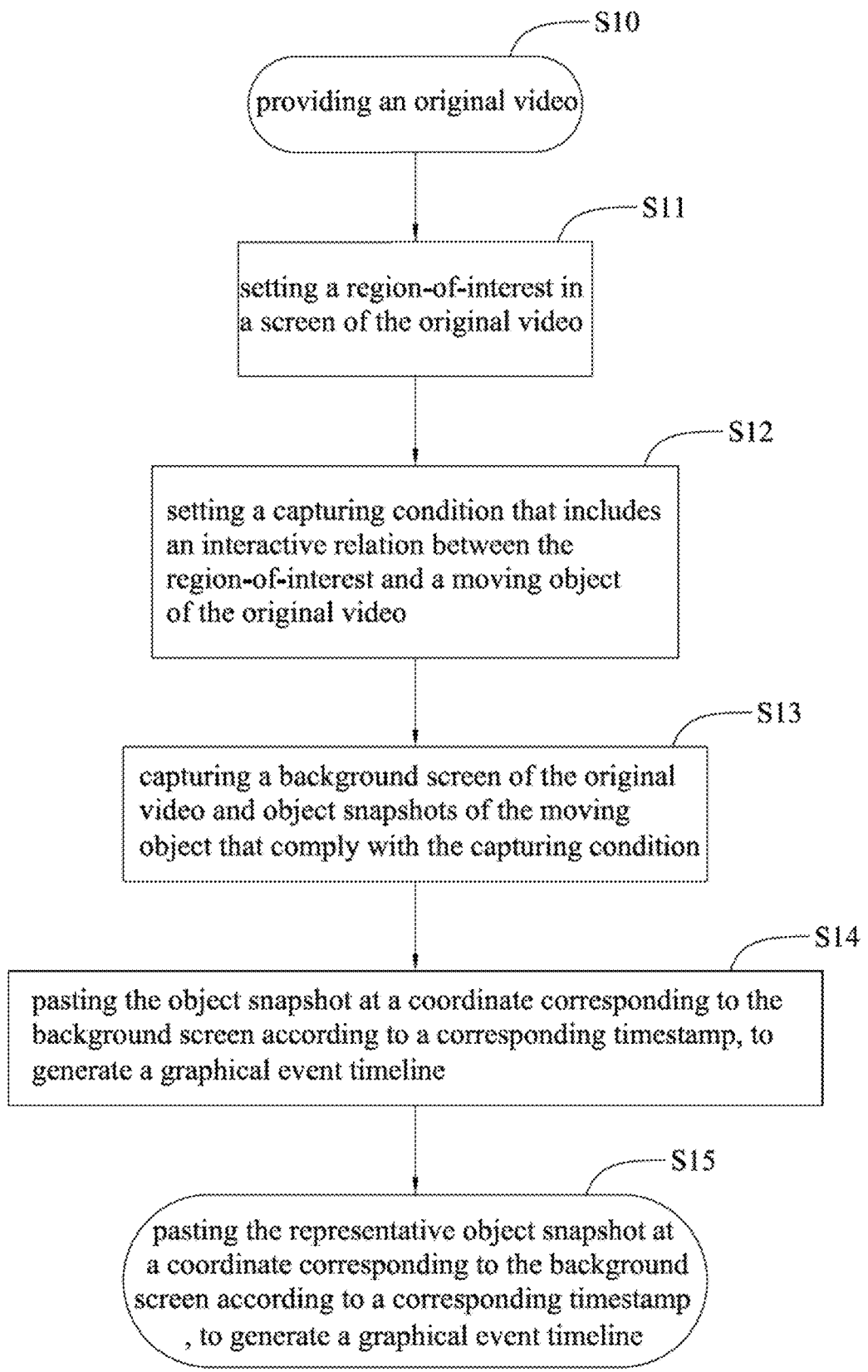
FIG. 1 is a flow chart of a video searching method of a first embodiment according to the present invention.

Referring to FIG. 1, a flow chart of a video searching method of a first embodiment according to the present invention is shown. The video searching method comprises steps S10-S15.

In step S10, an original video is provided. The video searching method proceeds to step S11.

In step S11, a region-of-interest in a screen of the original video is set. The video searching method proceeds to step S12.

In step S12, a capturing condition is set that includes an interactive relation between the region-of-interest and a moving object in the original video. The video searching method proceeds to step S13.

In step S13, a background screen of the original video and object snapshots of the moving object that comply with the capturing condition are captured. The video searching method proceeds to step S14.

In step S14, at least one of the object snapshots captured from the same moving object is selected as a representative object snapshot, or some of the object snapshots are integrated as a single representative object snapshot. The video searching method proceeds to step S15.

In step S15, the representative object snapshot is pasted at a coordinate corresponding to the background screen according to a corresponding timestamp, to generate a graphical event timeline.

Figure 2A:
FIG. 2A is a graph of an original video according to the present invention.

Referring to FIG. 2A, a graph of an original video according to the present invention is shown. Please also refer to the flow chart of FIG. 1. In step S10, an original video shown in FIG. 2A is provided. In step S11, a user sets a region-of-interest 20. In an embodiment, the region-of-interest 20 is a line segment, as shown in FIG. 2A. In another embodiment, the region-of-interest 20 includes a plurality of line segments, or is a planar region in any shape. Through the setting of the region-of-interest 20 as a key portion for the searching operation, the non-key portion in the original video can be ignored in subsequent steps, and the searching efficiency is improved. For instance, if a user wants to search the original video for a specific pedestrian, the region-of-interest 20 can be a possible region that the pedestrian passes.

Figure 2B:
FIG. 2B is another graph of an original video according to the present invention.

Referring to FIG. 2B, another graph of an original video according to the present invention is shown. Please also refer to the flow chart of FIG. 1. In step S12, a user sets a capturing condition that includes an interactive relation between the region-of-interest 20 and the moving object 21 in the original video. For instance, the interactive relation is that the moving object 21 contacts the region-of-interest 20, or the moving object 21 contacts the region-of-interest 20 "at the first time."

Figure 3:
FIG. 3 is object snapshots of a moving object captured according to the present invention.

Referring to FIG. 3, an object snapshot of the moving object captured according to the present invention is shown. Please also refer to the flow chart of FIG. 1. In step S13, the background screen of the original video and the object snapshots of the moving object that comply with the capturing condition are captured. In step S14, at least one of the object snapshots captured from the same moving object is selected as a representative object snapshot, or some of the object snapshots are integrated as a single representative object snapshot 30, 31.

In an embodiment, in step S12 the interactive relation is set as the moving object 21 contacting the region-of-interest 20. Therefore, in different time when step S13 is executed, one or more object snapshots can be captured from the same moving object 21. When the moving object 21 interacts with the region-of-interest 20, through step S14, some of the object snapshots are captured and integrated as a complete object snapshot, e.g., a complete representative object snapshot 30, that represents a specific moving object 21, to avoid that the same object appears in an adjacent region of two captured screens. For instance, the region-of-interest 20 can be set as a line in a pixel width, and some of the object snapshots are a portion of the moving object 21 that overlaps the region-of-interest 20 when the moving object 21 moves and intersects with the region-of-interest 20. As a result of the integration, the objects in the representative object snapshot 30 may be deformed due to the variation of the length of time when the object contacts the region-of-interest 20.

In an embodiment, in step S14, a representative single object snapshot or a single object snapshot at a representative time point, such as a single object captured when the moving object 21 contacts the region-of-interest 20 in the first time, is selected. Since only one representative object snapshot 31 is selected for the same moving object 21, repetitive object snapshots and shape deformation do not appear due to the prolonging of the time when the moving object 21 contacts the region-of-interest 20.

Figure 4:
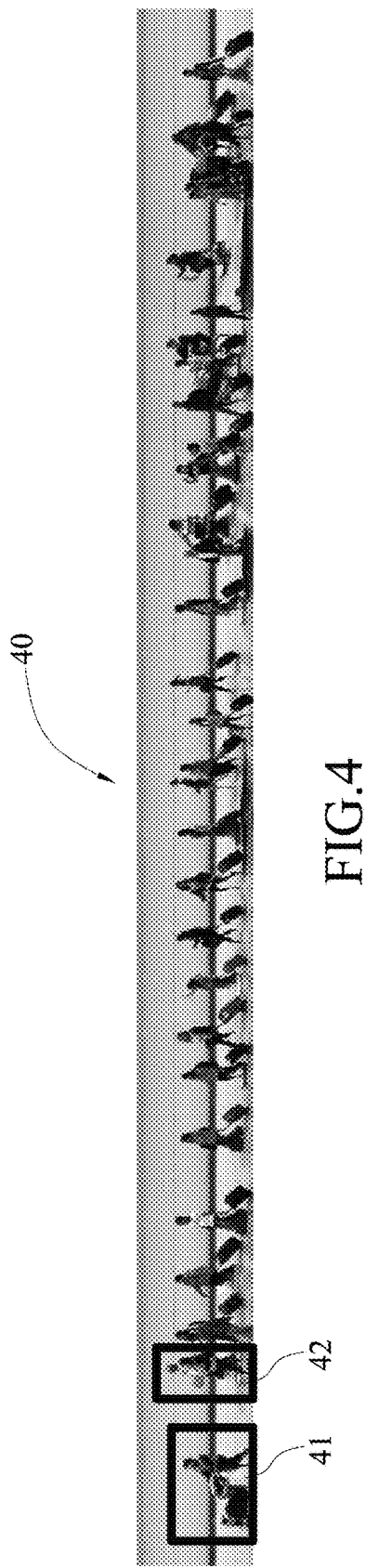
FIG. 4 shows an embodiment of a graphical event timeline generated according to the present invention.

Referring to FIG. 4, an embodiment of a graphical event timeline generated according to the present invention is shown. Please also refer to the flow chart of FIG. 1. In step S15, the representative object snapshot is pasted at a coordinate corresponding to the background screen according to a corresponding timestamp (not shown), to generate a graphical event timeline 40. In an embodiment, the representative object snapshot is captured from the original video at the timestamp (e.g., [00:00:00] representing [zero hour: zero minute:zero second]). The timestamp can be hid or displayed around the representative object snapshot. The leftmost object snapshot 41 in the graphical event timeline 40 is the earliest one of the object snapshots that is captured from the original video. At lease one selected from the object snapshots or some of the object snapshots that are integrated is referred to as a representative object snapshot. The next one is a representative object snapshot 42, which is pasted at a coordinate corresponding to the background screen from left to right. Therefore, a user is allowed to inspect all of the object snapshots through the graphical event timeline 40. In an embodiment in which only one object snapshot is captured from the same moving object 21 as the representative object snapshots 41 and 42, the representative object snapshots 41 and 42 do not appear repetitive object snapshots or have any shape deformed due to the prolonging of the time when the moving object 21 contacts the region-of-interest 20. As a result, corresponding relations of specific objects at a plurality of time and a time relation among a plurality of object-of-interests can be provided, a user can thus easily understand the moving behaviors of the object in a video, and the efficiency of searching a video for objects is greatly increased.

Figure 5:
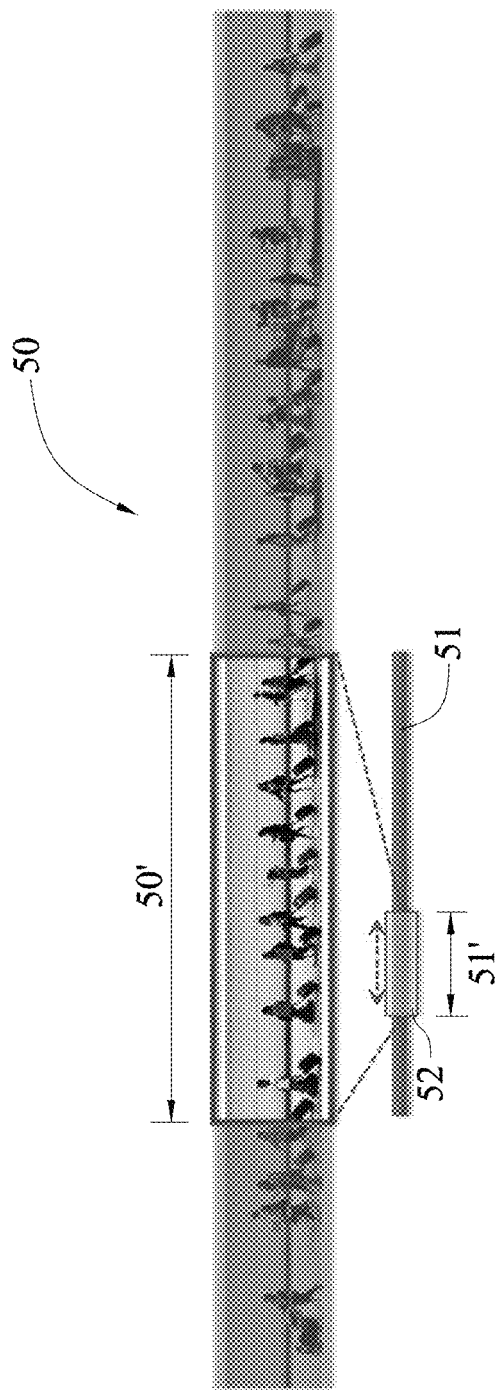
FIG. 5 shows an embodiment of another graphical event timeline generated according to the present invention.

Referring to FIG. 5, an embodiment of another graphical event timeline generated according to the present invention is shown. In an embodiment, the graphical event timeline 50, if having too long a length because the original video is too long or has too great a number of objects and being hard to be displayed or searched, can selectively comprise generating a time axis 51. The time axis 51 corresponds to the graphical event timeline 50, and has a sliding window 52 thereon that overlaps a portion of the time axis 51'. The display time location and ratio of the graphic event timeline portion 50' at the time axis portion 51' are displayed. A user can thus select and inspect the displayed graphical event timeline portion 50' at the position of the sliding window 52 on the time axis 51.

Figure 6:
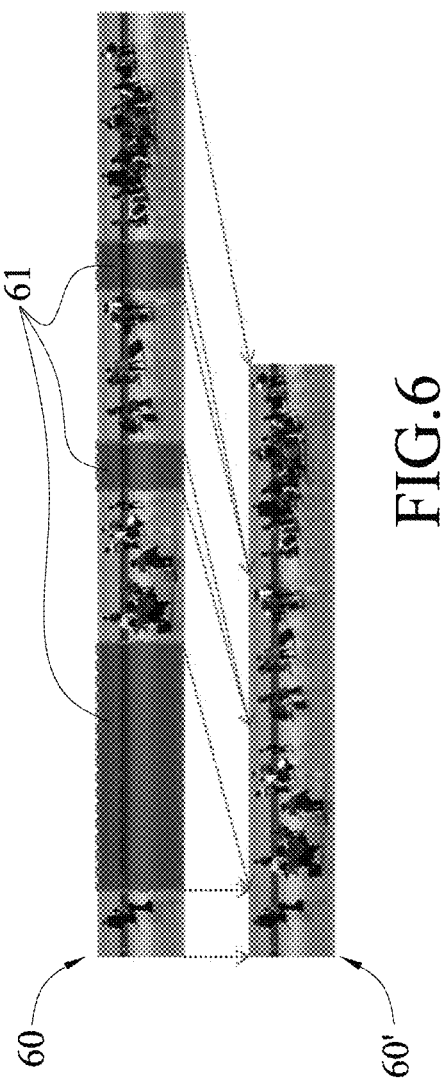
FIG. 6 shows embodiments of the graphical event timeline that are not hid and hid, respectively.

Referring to FIG. 6, embodiments of the graphical event timeline that are not hid and hid, respectively, are shown. In an embodiment, a portion 61 of the graphical event timeline 60 that is not pasted to the representative object snapshot is hid selectively, and the hid portion 61 is displayed when a displaying instruction for the hid portion is received. As shown in FIG. 6, some time segments of the original video do not have moving objects that comply with the capturing condition, and the graphical event timeline 60 may have some portions 61 that are not pasted to the representative object snapshot. The portions 61 are not the key searching points, and can thus be hid, to obtain a concise graphical event timeline 60', for a user to search the display panel the objects of more time segments.

Figure 7:
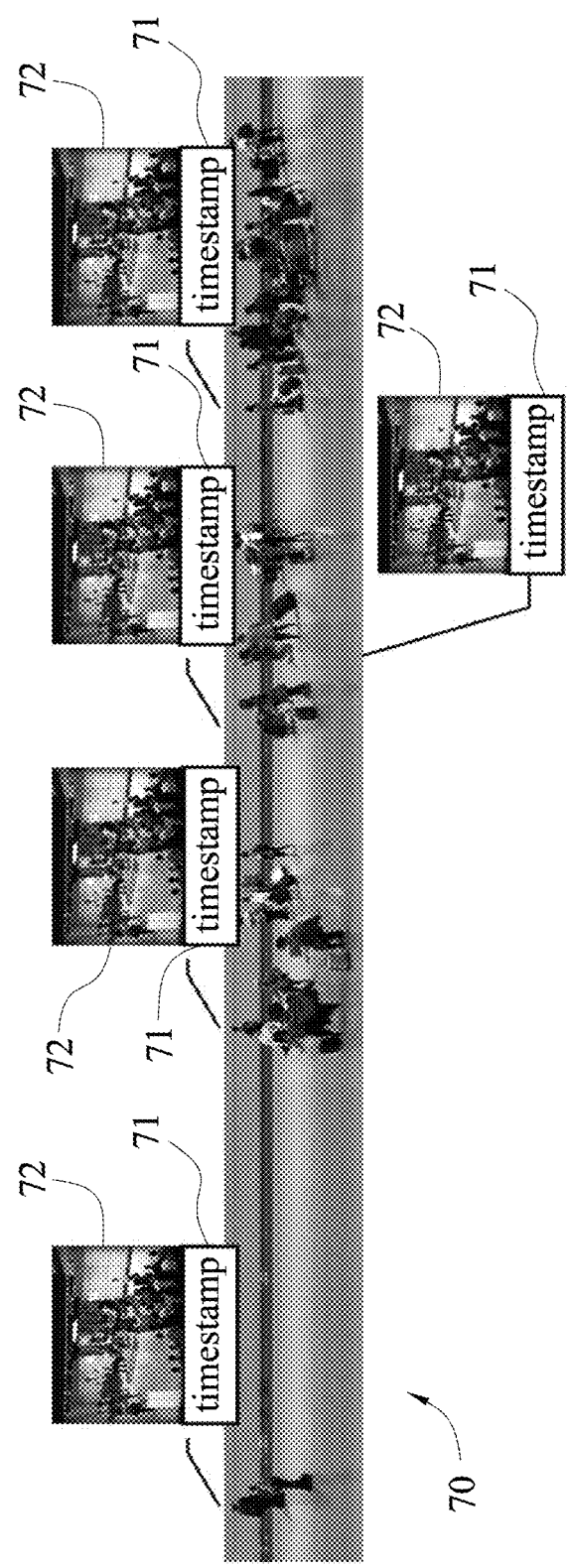
FIG. 7 shows an embodiment of a graphical event timeline that has a timestamp and an original video screen.

Referring to FIG. 7, an embodiment of a graphical event timeline that has a timestamp and an original video screen is shown. In an embodiment, the timestamp 71 (e.g., [00:00:00] representing [zero hour:zero minute:zero second]) that is hid originally and displayed in the graphical event timeline 70 when a displaying timestamp instruction is received and the complete screen snapshot 72 of the original video when the representative object snapshot in the graphical event timeline 70 captured from the original video is displayed when a displaying screen snapshot instruction is received can be included selectively. For instance, a user can display the timestamp 71 or screen snapshot 72 of the representative object snapshot by clicking through cursors (or any other similar methods) the representative object snapshot in the graphical event timeline 70, to help the user to further understand the relating messages of the representative object snapshot. In another embodiment, as shown in FIG. 7, preset keys are clicked through cursors to display the timestamp 71 or screen snapshot 72 of all the representative object snapshots.

In another embodiment, setting a filtering condition can be included selectively. In an embodiment, the filtering condition relates to the moving object, and the representative object snapshots of the moving object that do not comply with the filtering condition are deleted or hid from all of the captured representative object snapshots. In another embodiment, the filtering condition relates to a size, color, texture, material, moving direction or behavior of the moving object. Through the setting of the filtering condition, a specific object can be searched easily.

In another embodiment, receiving an assigned displaying instruction can be included selectively. In an embodiment, the assigned displaying instruction assigns one of the representative object snapshots in the graphical event timeline, and a time point from the assigned representative object snapshot from a time point of the original video or a time point earlier than the original video is captured after the assigned displaying instruction is received, for the original video to be displayed.

Figure 8:
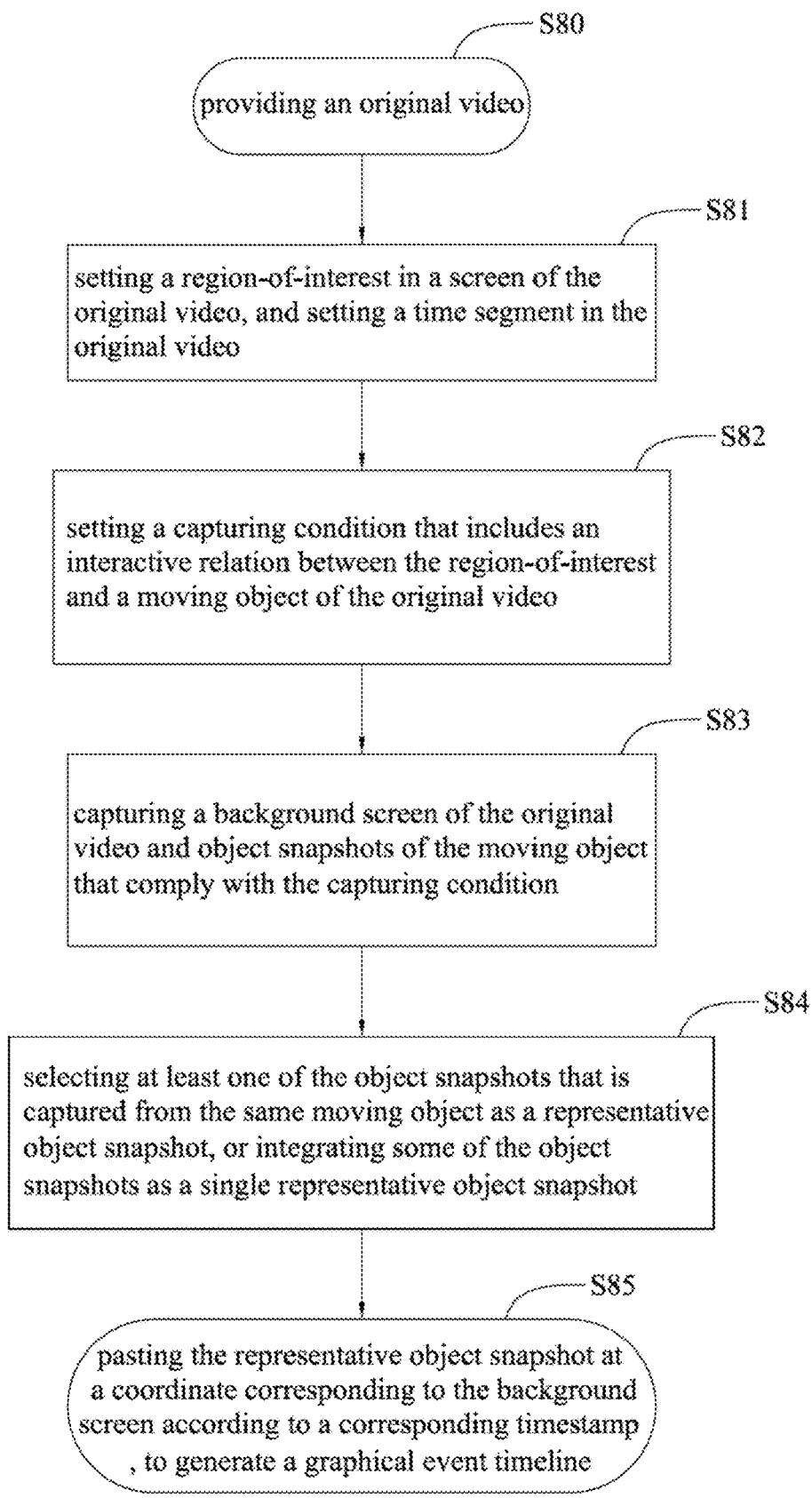
FIG. 8 is a flow chart of a video searching method of a second embodiment according to the present invention.

Referring to FIG. 8, a flowchart of a video searching method of a second embodiment according to the present invention is shown. The video searching method comprises steps S80-S85.

In step S80, an original video is provided. The video searching method proceeds to step S81.

In step S81, a region-of-interest in the original video is set, and a time segment in the original video is set. The video searching method proceeds to step S82.

In step S82, a capturing condition is set that includes an interactive relation between the region-of-interest and a moving object in the original video. The video searching method proceeds to step S83.

In step S83, the background screen of the original video and the object snapshots of the moving object in the time segment of the original video that comply with the capturing condition. The video searching method proceeds to step S84.

In step S84, at least one of the object snapshots that is captured from the same moving object is selected as a representative object snapshot, or some of the object snapshots are integrated as a single representative object snapshot. The video searching method proceeds to step S85.

In step S85, the object snapshot is pasted at a coordinate corresponding to the background screen based on the corresponding timestamp, to generate a graphical event timeline.

The flowchart shown in FIG. 8 can be performed in accordance with the embodiments shown in FIGS. 2A-7, and can be applied to an auxiliary searching of an original video recorded by a video surveillance system. A time segment, in which a user is interested, is set in the recorded original video, and the representative object snapshots of the moving object that comply with the capturing condition are captured only in the time segment. When a user wants to search for a specific time segment, these embodiments can further improve the searching efficiency.

Figure 9A:
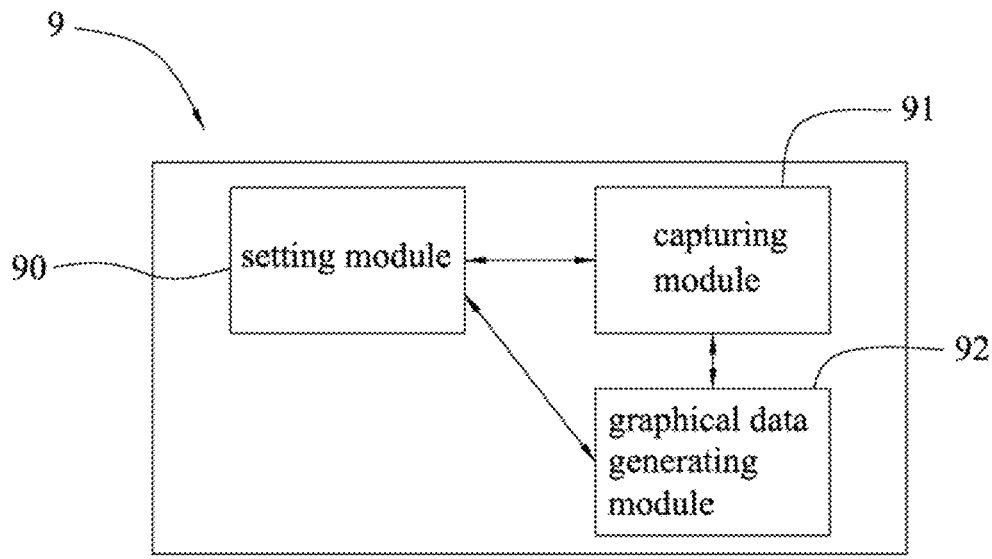
FIG. 9A is a block diagram of a video searching system of an embodiment according to the present invention.

Referring to FIG. 9A, a block diagram of a video searching system according to the present invention is shown. In another embodiment of the present invention, a video searching system 9 is provided that is applied to auxiliary searching of an original video. The video searching system 9 comprises a setting module 90, a capturing module 91, and a graphical data generating module 92.

The setting module 90 sets a region-of-interest in a screen of the original video, sets a capturing condition that includes an interactive relation between the region-of-interest and a moving object in the original video, and transmits the capturing condition to the capturing module 91.

The capturing module 91 captures a background screen of the original video and object snapshots of the moving object that comply with the capturing condition and corresponding timestamps.

The graphical data generating module 92 selects at least one of the object snapshots captured from the same moving object by the capturing module 91 as a representative object snapshot, or integrates some of the object snapshots as a single representative object snapshot, and pastes the representative object snapshot at a coordinate corresponding to the background screen based on the corresponding timestamp, to generate a graphical event timeline.

Figure 9B:
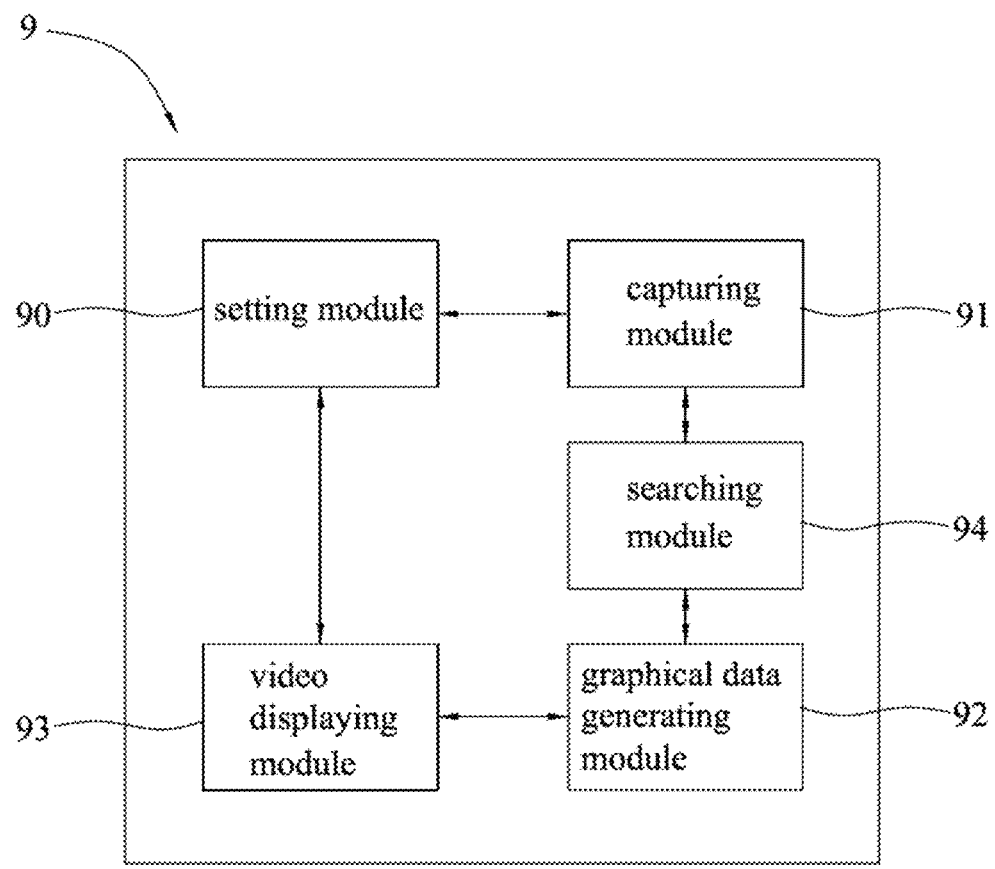
FIG. 9B is a block diagram of another video searching system of an embodiment according to the present invention.
Figure 10:
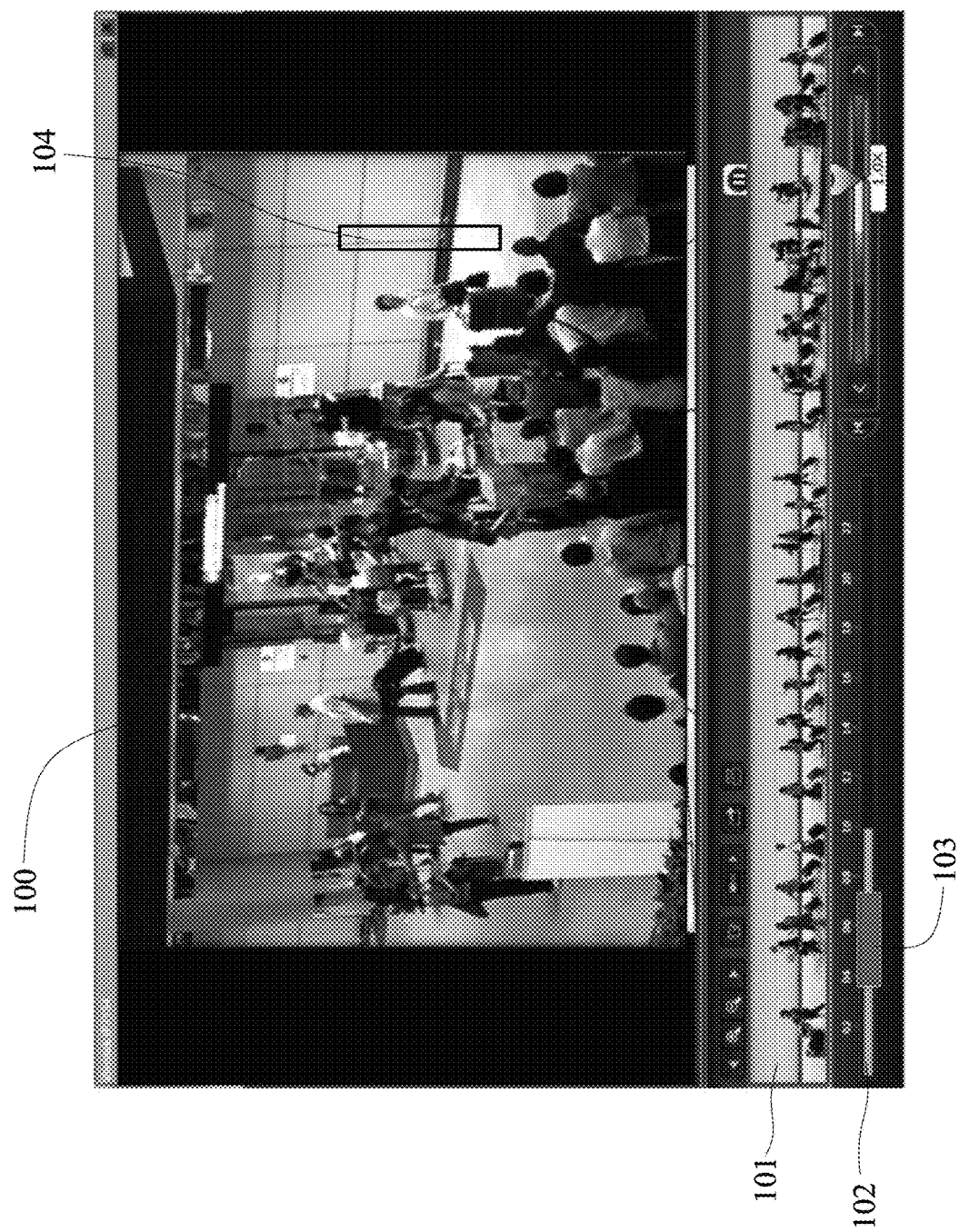
FIG. 10 shown an embodiment of a screen displayed by the video displaying module shown in FIG. 9B.

Referring to FIG. 9B, a block diagram of another video searching system of an embodiment according to the present invention is shown. As shown, a video searching system 9 according to the present invention may selectively comprise a video displaying module 93 that displays the original video and the graphical event timeline generated by the graphical data generating module 92, as shown in FIG. 10, which shows an embodiment of a screen displayed by the video displaying module 93, including the displayed original video 100 and the graphical event timeline 101. In the original video 100, a region-of-interest 104 is included.

In an embodiment, as shown in FIG. 10, the video displaying module 93 further displays a time axis 102. The time axis 102 corresponds to a graphical event timeline 101. The time axis 102 has a sliding window 103 that overlaps a portion of the time axis 102, and displays the display time location and ratio of the graphic event timeline portion at the time axis 102.

In an embodiment, the video displaying module 93 may further hide a portion of the graphical event timeline that is not pasted to the object snapshot, and displays the hid portion when a displaying instruction for the hid portion is received.

In an embodiment, the video displaying module 93, when receiving a displaying timestamp instruction, may display the time when the object snapshot in the graphical event timeline that is captured from the original video.

In an embodiment, a video displaying module 93, when receiving a displaying screen snapshot instruction, may further display the complete screen snapshot of the original video when the object snapshot in the graphical event timeline is captured from the original video.

In an embodiment, as shown in FIG. 9B, a video searching system 9 according to the present invention may selectively comprise a searching module 94 that sets a filtering condition relating to the moving object. The searching module 94 further deletes or hides the object snapshots of the moving object that do not comply with the filtering condition. In an embodiment, the filtering condition relates to a size, color, texture, material, moving direction or behaviors of the moving object.

In an embodiment, the video displaying module 93 may further receive an assigned displaying instruction, as shown in FIG. 10. The assigned displaying instruction assigns one of the object snapshots in the graphical event timeline 101, captures a time point of the assigned object snapshot captured from the original video 100 or a time point earlier than the time point of the original video after receiving the assigned displaying instruction, and displays the original video 100.

In an embodiment, the graphical data generating module 92 may further integrate at least one object snapshot that is captured from the same moving object into a single object snapshot.

In summary, a video searching method and a video searching system according to the present invention set searching key points including a region-of-interest and a capturing condition, filters out a moving object that a user is interested in, captures object snapshots of the moving object, and pastes the object snapshots at a coordinate corresponding to the background screen based on their timestamps, to generate and display all of the object snapshots. Therefore, mapping relations of a specific object at a plurality of time points and a time relation among a plurality of object-of-interests are provided, a user can thus understand the moving behaviors of the object in the vide, the efficiency of searching an video for objects is greatly increased, and the key contents of the video can be displayed completely. Additionally, a video displaying module, a searching module and related displaying and filtering functions can be added to the video searching system, to further increase the efficiency of searching the video for objects.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A video searching method applied to an auxiliary searching of an original video, comprising executing on a processor the following steps of:
   setting a region-of-interest in a screen of the original video;
   setting a capturing condition that includes an interactive relation between the region-of-interest and a moving object of the original video;
   capturing a background screen of the original video and object snapshots of the moving object that comply with the capturing condition;
   selecting at least one of the object snapshots captured from the same moving object as a representative object snapshot, or integrating some of the object snapshots as a single representative object snapshot;
   pasting the representative object snapshot at a coordinate corresponding to the background screen according to a corresponding timestamp, to generate a graphical event timeline; and
   generating a time axis that corresponds to the graphical event timeline and has a sliding window thereon that overlaps a portion of the time axis, and displaying a portion of the graphical event timeline that corresponds to the time axis.

2. The video searching method of claim 1, further comprising executing on a processor the step of:
   hiding a portion of the graphical event timeline that is not pasted with the representative object snapshot, and displaying the hid portion after a displaying instruction for the hid portion is received.

3. The video searching method of claim 1, further comprising executing on a processor the step of:
   after a displaying timestamp instruction is received, displaying the timestamp of the representative object snapshot in the graphical event timeline.

4. The video searching method of claim 1, further comprising executing on a processor the step of:
   after a displaying screen snapshot instruction is received, displaying the complete screen snapshot of the original when the representative object snapshot in the graphical event timeline is captured from the original video.

5. The video searching method of claim 1, further comprising executing on a processor the step of:
   setting a filtering condition that relates to the moving object, and deleting or hiding captured representative object snapshots of the moving object that do not comply with the filtering condition.

6. The video searching method of claim 5, wherein the filtering condition relates to a size, color, texture, material, moving direction or behavior of the moving object.

7. The video searching method of claim 1, further comprising executing on a processor the step of:
receiving an assigned displaying instruction, capturing a time point from the assigned representative object snapshot from a time point of the original video or a time point earlier than the original video, and displaying the original video, wherein the assigned displaying instruction assigns one of the representative object snapshot in the graphical event timeline.

8. The video searching method of claim 1, wherein the region-of-interest refers to a line in a pixel width, and a portion of the object snapshot refers to a portion of the object snapshot that overlaps the region-of-interest.

9. The video searching method of claim 1, wherein the region-of-interest in the screen of the original video is set in a time segment in the original video, and the object snapshots of the moving object that comply with the capturing condition are captured in the time segment of the original video.

10. A non-transitory machine readable medium storing a program having a video searching system applied to an auxiliary searching of an original video, the program execution by a processor, the video searching system comprising:
a setting module that sets a region-of-interest in the original video, and sets a capturing condition that includes an interactive relation between the region-of-interest and a moving object of the original video;
a capturing module that captures a background screen of the original video and object snapshots of the moving object that comply with the capturing condition; and
a graphical data generating module that selects at least one of the object snapshots captured from the same moving object as a representative object snapshot, or integrating some of the object snapshots as a single representative object snapshot, and pastes the representative object snapshot at a coordinate corresponding to the background screen according to a corresponding timestamp, to generate a graphical event timeline.

* * * * *